Feb. 6, 1962    G. STRAM    3,020,018
DISCHARGE VALVE

Filed March 23, 1959    3 Sheets-Sheet 1

INVENTOR.
GEORGE STRAM
BY
Otto Moeller
ATTORNEY

Feb. 6, 1962 G. STRAM 3,020,018
DISCHARGE VALVE

Filed March 23, 1959 3 Sheets-Sheet 2

INVENTOR.
GEORGE STRAM
BY Otto Moeller
ATTORNEY

Feb. 6, 1962   G. STRAM   3,020,018
DISCHARGE VALVE
Filed March 23, 1959   3 Sheets-Sheet 3
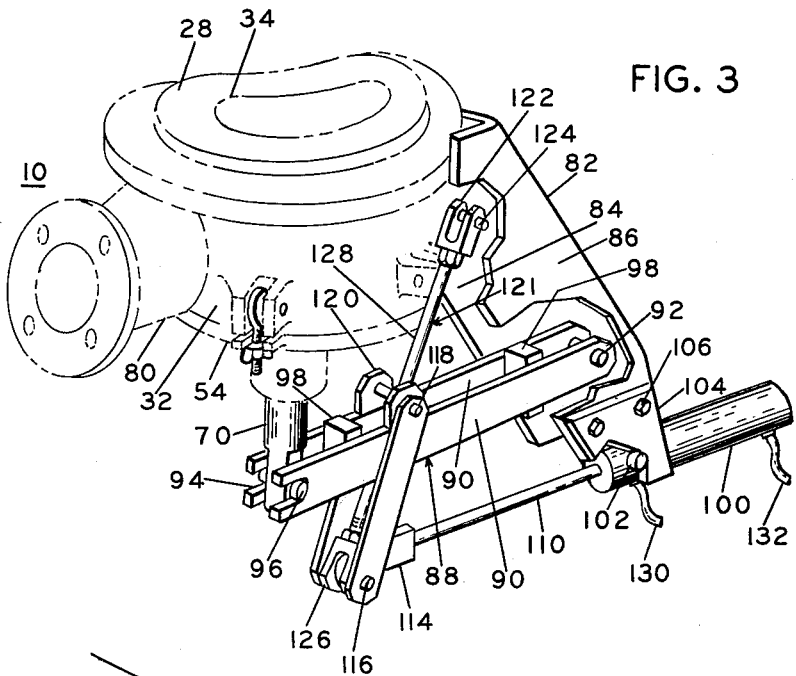
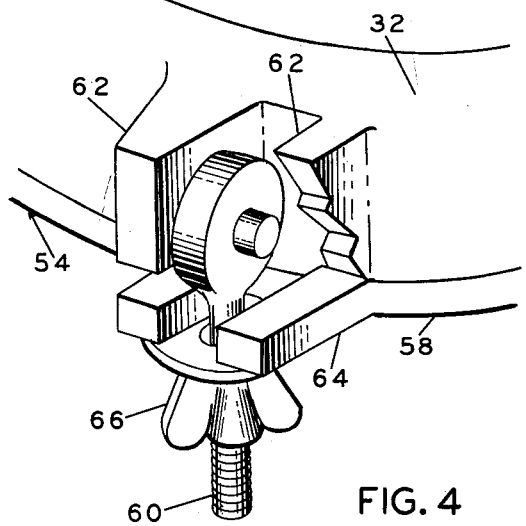
INVENTOR.
GEORGE STRAM
BY *Otto Moeller*
ATTORNEY 3,020,018
DISCHARGE VALVE
George Stram, Hellam, Pa., assignor to Capitol Products Corporation, Mechanicsburg, Pa., a corporation of Pennsylvania
Filed Mar. 23, 1959, Ser. No. 801,271
4 Claims. (Cl. 251—58)

This invention relates to valves and more particularly to bottom discharge valves for bowls and tanks employed in mixing or processing viscous flowable materials.

Many edible products such as cake batters and creams of sugar and shortening, and industrial products such as paints are mixed or processed in bowls or tanks and after completion of the mixing or processing operation are discharged or drawn off through a valve controlled opening at the bottom of the bowl or tank. Because of the high viscosity and the slow flowing nature of these products, the bowl or tank discharge opening must be relatively large to facilitate flow of the products therethrough at the conclusion of the mixing or processing operation.

The large discharge opening necessarily requires a large valve disc, and it is an object of the invention to provide a valve and operating mechanism for the valve disc thereof, that is compact and occupies a minimum of height beneath the bowl or tank, and wherein the valve disc and stem in the open position of the valve present a minimum of obstruction to the free flow of the mixed or processed material through the valve body from the discharge opening of the bowl or tank to the valve body outlet.

Particularly in the mixing or processing of edible products, it is of utmost importance, at the conclusion of a day's run or between runs of different materials, to thoroughly clean the various parts of the valves from adhering material. It is, therefore, an important object of the invention to provide a valve wherein the valve disc and stem are readily and conveniently movable to a position outside the valve body affording ready access for cleaning. A related object is to provide a valve construction wherein the interior of the valve body is readily accessible for cleaning by removal of a cover having a diameter substantially equal to the internal diameter of the valve body and which cover is removable as a unit with the valve disc and stem.

In mixing and processing apparatus rotating mixing blades are employed, pitched in a direction to move the material toward the discharge opening in the cylindrical tank bottom, the ends of the blades sweeping circumferentially across the discharge opening. In the present construction, the discharge opening and the valve controlling the opening are offset at one side of the vertical longitudinal medial plane of the tank bottom so that the edge of the opening first contacted by the mixing blades during their rotation is at an elevation lower than the edge of the opening last contacted by the mixing blades during their rotation. This is an important feature of the invention, particularly in the case of materials having a high cohesive characteristic, since the higher edge of the discharge opening functions to deflect the material downwardly into the valve body, and minimizes the tendency of the rotating blades to sweep the material across the discharge opening.

The angular disposition of the valve decreases the vertical space beneath the lowermost portion of the tank taken up by the valve and its operating mechanism, thus permitting the tank to be disposed closer to the floor line. Additionally, the angular disposition of the valve provides for sloping of the valve body well floor downwardly to an outlet in the valve body side wall, whereby flow of the material through the valve body well is facilitated.

Still another object is to provide simple means exteriorly of the valve body and associated with the valve operating means for adjusting the position of the valve disc relative to its seat.

These and other features of the invention will be best understood and appreciated from the following description of a preferred embodiment thereof, selected for purposes of illustration and shown in the accompanying drawings, in which:

FIGURE 3 is an enlarged view in perspective of the valve operating means shown in FIGURE 1, with the valve body illustrated in phantom; and FIGURE 4 is an enlarged view in perspective of the means for securing the bottom end closure of the valve to the valve body.

Figure 1:
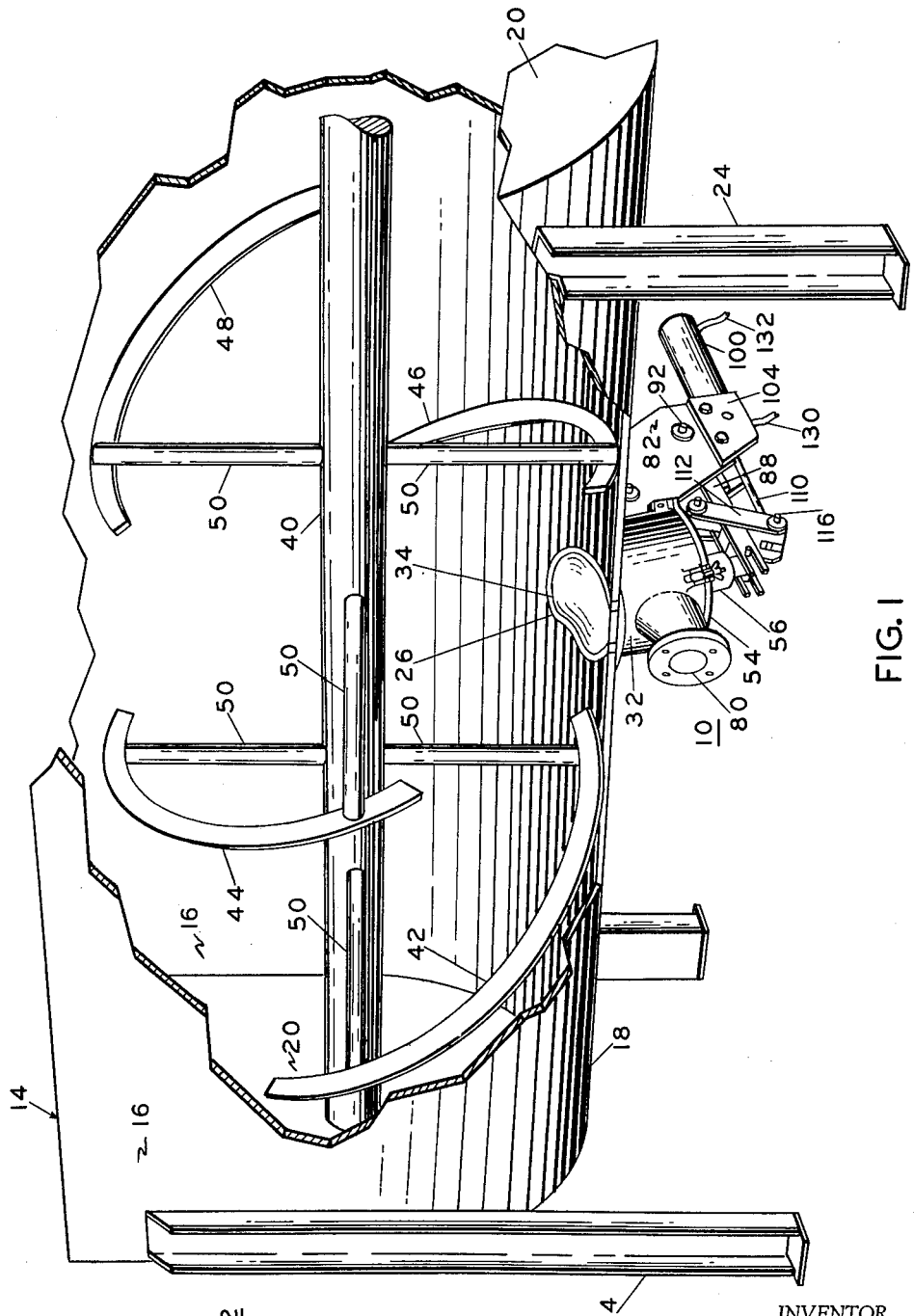
FIGURE 1 is a view in perspective of the discharge valve applied to the bottom of a mixing receptacle, with parts broken away.

Referring to the drawings, and particularly to FIGURE 1, the valve 10 is shown, for purpose of illustration, as applied to the bottom of a spiral ribbon blender or mixer 12. The mixer 12 embodies a trough shaped receptacle 14 having substantially vertical side walls 16, a semi-cylindrical bottom wall 18 and vertical end walls 20. The mixer receptacle is supported up off the floor by suitable legs 24.

The bottom of the semi-cylindrical lower wall 18 is provided, midway between the vertical end walls 20 of the receptacle 14, with an off center opening 26 that extends farther up along one side of the semi-cylindrical wall 18 than the other. In this opening 26 is received the upper annular surface 28 of the inlet end 30 of the cylindrical valve body 32. The annular surface 28 is formed with the same radius of curvature as the semi-cylindrical wall 18 to provide a smooth continuation thereof, and defines an opening 34 constituting both the discharge opening of the receptacle 14 and the inlet opening of the valve 10. This opening 34 is disposed adjacent and at one side of the intersection of the longitudinal vertical medial plane of the receptacle 14 with the semi-cylindrical bottom wall 18.

The valve 10 is secured to the bottom of the receptacle 14 in any suitable manner as, for example, by weldments 36 and 38 between adjoining portions of the semi-cylindrical wall 18 and the inlet end 30 of the valve body 32.

The mixing apparatus within the receptacle 14 includes a longitudinally extending shaft 40 journaled at its ends in the end walls 20 and to which are secured a plurality of axially spaced and radially offset spiral blades 42, 44, 46 and 48. The blades each extend through a helix of at least 90°, and are supported near their respective ends by rods 50 extending radially from the shaft 40. The support rods are of a length so that the blades will lie in close proximity to the semi-cylindrical wall 18, the blades 42, 44 being pitched in a direction to move the material being mixed from one end wall 20 toward the discharge opening 34, and the blades 46, 48 being pitched in the opposite direction to move the material from the other end wall 20 toward the discharge opening 34. The blades 44 and 46 are so disposed on the shaft 40 that their adjacent ends overlap and sweep across the discharge opening 34 upon rotation of the shaft 40. It is of course understood that the discharge valve 10 can be located adjacent one end or the other of the mixing receptacle 14, in which case the blades are pitched in the same direction to move the material toward the discharge opening of the receptacle. Also additional or other forms of blades may be employed to facilitate the mixing of the materials in the receptacle.

As before stated, the discharge opening 34 is offset to one side of the longitudinal vertical medial plane of the receptacle 14, it being offset to that side whereby, upon rotation of the blades in a direction to move the material toward the discharge opening 34, the adjacent ends of the blades 44, 46 as they sweep across the discharge opening 34 first engage the edge of the opening 34 that is at the lowest elevation. This is an important feature, since the higher marginal edge of the discharge opening 34 functions to deflect the material through the opening 34 into the valve chamber 52 of the valve body 32, thereby minimizing any tendency of the adjacent ends of the blades 44, 46 to sweep the material across the opening 34, this being particularly true in the case of materials having a high cohesive characteristic.

With the discharge opening 34 offset, as above described, the cylindrical valve body 32 can be and is angularly disposed with respect to the longitudinal vertical medial plane of the receptacle 14 so that the extended axis of the cylindrical body 32 intersects the center of curvature of the bottom wall 18 of the receptacle 14. The cylindrical valve body 32 is open at its lower end to receive an easily removable end cover 54 provided with a peripheral sleeve 56 for slidably guiding the end cover 54 during insertion or removal thereof. An annular flange 58 formed with the sleeve 56 is adapted to abut the lower end of the cylindrical body 32 upon insertion of the end cover 54 whereby to locate the cover 54 in the open lower end portion of the cylindrical body 32. The end cover 54, as best shown in FIGURE 4, is secured tightly in place by threaded bolts 60 pivotally mounted on lugs 62 disposed in spaced relation about the valve body 32, the bolts 60 being swingable into and out of engagement with the bifurcated ears 64 formed with the end cover flange 58, and wing nuts 66 being threaded on the projecting ends of the bolts 60 and adapted to be drawn up tightly.

The end cover 54 is formed with a central sleeve bearing 68, coaxial with the axis of the cylindrical body 32, for slidably receiving the valve stem 70. On its inner end the valve stem 70 carries a frusto-conical valve disc 72 arranged to seat against a frusto-conical valve seat 74 formed in the inlet end 30 of the valve body 32. The base diameter of the valve disc 72 is appreciably less than the diameter of that portion of the cylindrical valve body below the valve seat 74 to facilitate removal of the valve disc 72 through the open lower end of the valve body, as hereinafter described. The upper surface 76 of the valve disc 72 is arcuately formed on the same radius of curvature as the receptacle bottom wall 18, so that when the valve disc 72 is seated, the surface 76 forms a flush, smooth continuation of receptacle bottom wall 18.

The planar inner surface of the end cover 54 forms a floor 78 for the valve chamber 52 which slopes downwardly toward the longitudinal vertical medial plane of the receptacle 14, thereby permitting complete drainage of material from the valve chamber 52 through the discharge outlet 80 disposed in the wall of the cylindrical valve body 32 adjacent the lower end of the valve chamber floor 78, the lowermost extremity of the discharge outlet being slightly below the lowermost extremity of the valve chamber floor 78.

Figure 2:
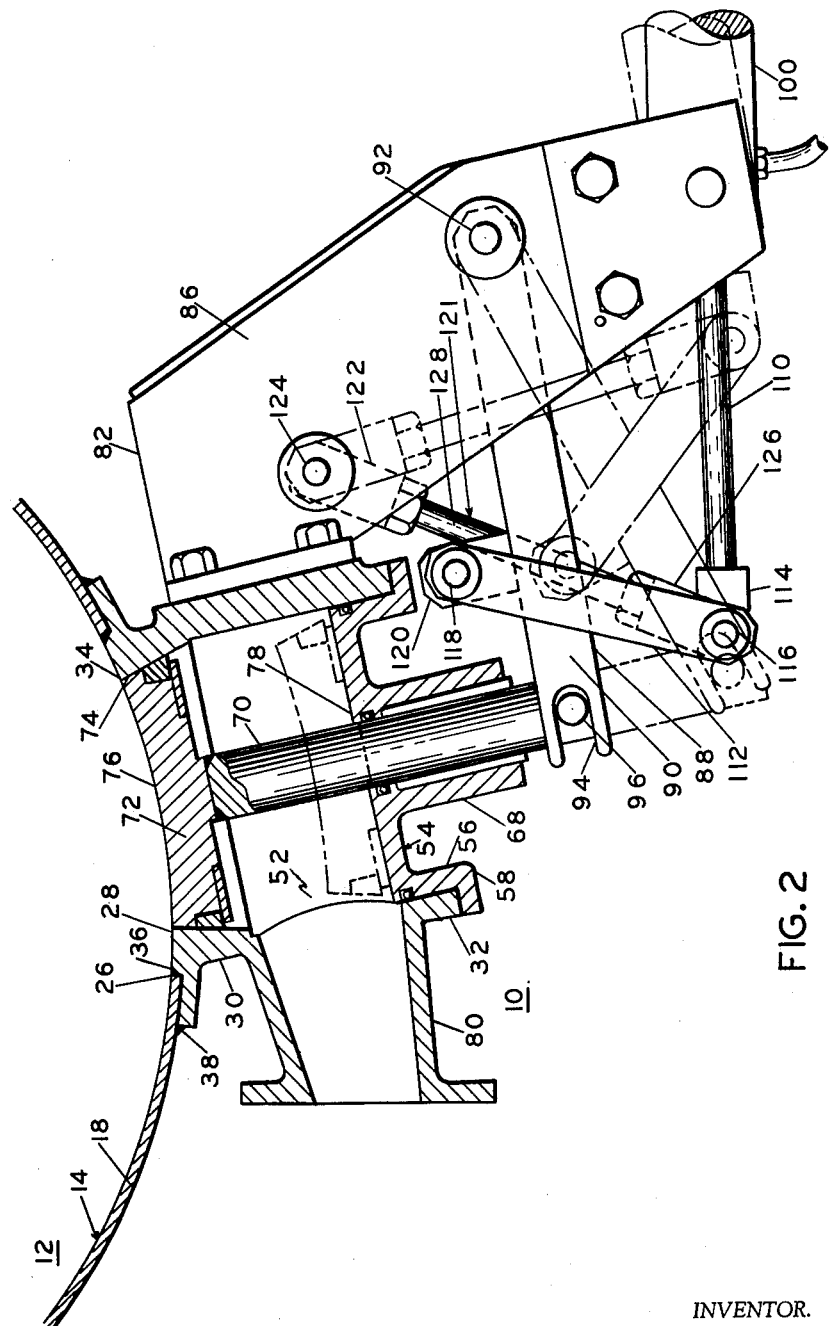
FIGURE 2 is an enlarged vertical transverse sectional view through the valve and the lower portion of the mixing receptacle, with parts shown in elevation.

Means, to be described, is provided for moving the valve disc 72 from its seated position, shown in full lines in FIGURE 2, to its open position against the valve chamber floor 78 as shown in broken lines. This means is supported by a bracket 82 comprising a pair of spaced parallel plates 84 and 86, the bracket 82 being secured in any suitable manner to the side of the valve body 32 opposite the valve outlet 80, and extending outwardly and downwardly therefrom.

A valve operating arm 88, comprising a pair of parallel laterally spaced bars 90, is pivotally mounted at one end on a pin 92 extending through the plates 84 and 86 of the bracket 82. At the other end of the valve operating arm 88, its spaced bars 90 straddle the valve stem 70, and slots 94 in the ends of the bars 90 are arranged to disengageably receive the projecting ends of a pin 96 extending through the valve stem 70. Spacer blocks 98 between and welded to the bars 90 of the valve operating arm 88, retain them in rigid relation with respect to each other. The connections of the valve operating arm 88 with the bracket 82 and the valve stem 70 are so disposed relative to each other that, in the seated or full line position of the valve disc 72, the valve operating arm extends in a direction perpendicular with respect to the axis of the valve stem 70, so that the depth of engagement of the pin 96 in the slots 94 of the valve operating arm 88 becomes progressively less as the valve stem and disc are lowered, thereby facilitating removal of the valve stem and disc through the open bottom of the valve body, as hereinafter described.

The operating mechanism for the valve comprises a substantially horizontally mounted air cylinder 100 disposed in close underlying relation with respect to the valve operating arm 88. The air cylinder is provided with trunnions 102 journaled in the depending extensions 104 of the bracket plates 84, 86, one of the extensions 104 being removably secured to respective bracket plate 86 by bolts 106 to permit mounting of the cylinder in the bracket. The cylinder 100 has a piston, not shown, to which piston rod 110 is connected. The free end of the piston rod 110 is pivotally connected to the valve operating arm 88 between the ends thereof by the links 112, in the manner now to be described. Secured to the free end of the piston rod 110 is a knuckle 114, through which projects a transverse pin 116. The lower ends of the links 112 are pivotally mounted on the projecting ends of the pin 116 at either side of the knuckle 114, while the upper ends of the links 112 are pivotally mounted on a pin 118 journaled in the upstanding lugs 120, which lugs 120 are formed with or secured to the bars 90 of valve operating arm 88 between the ends thereof.

An adjustable support arm 121 forms with the links 112 a toggle, which through the valve operating arm 88 holds the valve in closed position when the piston rod 110 is in extended position. The adjustable support arm 121 includes a knuckle 122 pivotally mounted on a pin 124 extending through the upper portion of the plates 84 and 86 of the bracket 82 and a knuckle 126 pivotally mounted on the pin 116 carried by piston rod knuckle 114. A rod 128 of the support arm 121 is formed at its ends with right and left hand threads, threaded in the knuckles 122 and 126. Thus by turning the threaded rod 128 in one direction or the other, the valve, through the toggle and operating arm 88 can be adjusted to insure a flush fit of the valve disc 72 in the seat 74 when the piston rod 110 is in extended position.

In order to open the valve, the cylinder 100 is operated to retract the piston rod 110, whereupon the various elements assume the broken line positions shown in FIGURE 2. In this latter position, the valve can be readily dis-assembled for cleaning or other purposes, by loosening the wing nuts 66 and moving the bolts 60 out of engagement with the bifurcated ears 64 of the end cover 54, whereupon the end cover 54 can be dropped out of engagement with the valve body 32. Also in this broken line position, with the toggle elements 112 and 121 between the piston rod 110 and valve operating arm 88 as shown in broken lines, removal of any of the pins 116, 118 or 124 permits the valve operating arm 88 to be swung downwardly about its pivotal connection with the bracket 82 the further small distance necessary to effect removal of the valve disc and stem from the valve body through its open lower end. Upon such removal, the valve disc and stem can be thoroughly cleaned and by insertion of a steam or water hose through the open lower end of the valve body the interior of the valve body and the valve seat can be thoroughly cleaned.

The mounting of the valve operating cylinder and valve operating arm in their relation with respect to each other and with respect to the bracket and the valve, together with the toggle linkage therebetween provides a very compact valve operating means occupying a minimum of space below the mixer receptacle permitting the receptacle to be supported relatively close to the floor.

Air is admitted to one end or the other of the air cylinder 100 through flexible lines 130 and 132, in which lines is interposed a valve (not shown) of any well known type for controlling passage of air through one or the other of the lines 130 and 132, for moving the piston rod 110 between its retracted and extended positions to in turn move the valve disc 72 between its broken line open position and its full line closed position.

I claim:

1. In a mixer having a receptacle provided with a semi-cylindrical bottom wall, a discharge opening in said semi-cylindrical bottom wall offset with respect to the longitudinal vertical medial plane of said receptacle, a valve for controlling discharge of material through said opening having a cylindrical body having its axis disposed perpendicular with respect to the plane of said discharge opening, said valve body having at its upper end an inlet passage communicating with said discharge opening and formed to provide a valve seat, said valve body being open at its lower end and having a removable end closure therefor, a discharge passage in the side of said cylindrical valve body adjacent the longitudinal vertical medial plane of said receptacle, a bracket secured to said cylindrical valve body at the side opposite said discharge passage and extending outwardly and downwardly therefrom, a valve stem in axial coincidence with the axis of said cylindrical valve body extending through said end closure, a valve disc carried by the upper end of said valve stem, and operating means carried by said bracket connected with the lower end of said valve stem for moving said valve disc into and out of engagement with said valve seat for closing and opening said inlet passage.

2. In a valve, a cylindrical valve body having an inlet passage in the upper end thereof forming a valve seat, a lower end closure and a discharge passage in the cylindrical side wall thereof, a valve element including a valve disc adapted to seat against said valve seat and a valve stem extending through said lower end closure, a bracket secured to the cylindrical side wall of said valve body opposite said discharge passage and extending outwardly and downwardly from said valve body, a valve element operating arm extending transversely with respect to the axis of said valve stem and having at one end a lost motion connection with said valve stem and at the opposite end a pivotal connection with said bracket, a substantially horizontally disposed air cylinder pivotally mounted on said bracket and having a piston rod extending therefrom below said valve element operating arm, and a toggle operatively connecting the free end of said piston rod and said valve element operating arm operating to lock said valve element against said valve seat in the extended position of said piston rod and to move said valve element away from said valve seat in the retracted position of said piston rod.

3. A construction as defined in claim 2, wherein said toggle includes a link pivotally connected at one end with said valve element operating arm and pivotally connected at its other end with the free end of said piston rod and includes also an arm having at one end a pivotal connection with said bracket and at the other end a pivotal connection with the free end of said piston rod to provide a support for said piston rod and to provide a support for said valve element through said link and said valve element operating arm.

4. A construction as defined in claim 3, wherein said support arm includes end portions and an intermediate portion having right and left hand threaded terminal portions adapted to be threaded in said end portions, whereby the effective length of said support arm may be shortened or lengthened by turning said intermediate portion in one direction or the other, to adjust the position of the valve disc with respect to said valve seat.

References Cited in the file of this patent

UNITED STATES PATENTS

| | | |
|---|---|---|
| 962,100 | Richards | June 21, 1910 |
| 1,179,922 | Hottmann | Apr. 18, 1916 |
| 1,615,273 | Hetherington | Jan. 25, 1927 |
| 1,772,578 | Harford | Aug. 12, 1930 |
| 1,950,630 | Ries | Mar. 13, 1934 |
| 2,241,316 | Porteous | May 6, 1941 |
| 2,256,891 | Burman | Sept. 23, 1941 |
| 2,290,527 | Bergtholdt | July 21, 1942 |
| 2,403,536 | Lewis | July 9, 1946 |

FOREIGN PATENTS

| | | |
|---|---|---|
| 968,477 | France | Apr. 26, 1950 |